United States Patent

Drummond et al.

[11] Patent Number: 5,979,748
[45] Date of Patent: Nov. 9, 1999

[54] TUBULAR CONTAINER WITH A HEAT SEAL HAVING AN INNER AND OUTER BEAD AND METHOD OF MANUFACTURING SAID CONTAINER

[75] Inventors: Michael T. Drummond, Laurinburg, N.C.; Alan D. Williams, Camden, S.C.

[73] Assignee: Sonoco Development, Inc., Hartsville, S.C.

[21] Appl. No.: 09/065,783

[22] Filed: Apr. 23, 1998

Related U.S. Application Data

[63] Continuation-in-part of application No. 08/796,793, Feb. 6, 1997, Pat. No. 5,829,669.

[51] Int. Cl.⁶ .................................................. B65D 5/64
[52] U.S. Cl. .................. 229/123.1; 156/69; 220/359.3; 229/5.5
[58] Field of Search ................................. 229/5.5, 123.1, 229/125.35; 220/359.2, 359.3, 359.4; 156/69; 53/478, 485

[56] References Cited

U.S. PATENT DOCUMENTS

| | | |
|---|---|---|
| 2,623,680 | 12/1952 | Wilcox . |
| 2,623,681 | 12/1952 | Wilcox . |
| 3,012,707 | 12/1961 | Gray . |
| 3,030,001 | 4/1962 | Stump . |
| 3,051,370 | 8/1962 | Hanlon . |
| 3,140,808 | 7/1964 | Taylor . |
| 3,144,193 | 8/1964 | Geist et al. . |
| 3,162,347 | 12/1964 | Taylor . |
| 3,196,762 | 7/1965 | Schmeltz . |
| 3,274,905 | 9/1966 | Demsey, Jr. et al. . |
| 3,279,333 | 10/1966 | Blair et al. . |
| 3,338,270 | 8/1967 | Denenberg . |
| 3,428,239 | 2/1969 | Wannamaker et al. . |
| 3,441,197 | 4/1969 | White . |
| 3,457,130 | 7/1969 | Morrison . |
| 3,491,935 | 1/1970 | Trotter, Jr. et al. . |
| 3,494,812 | 2/1970 | Cvacho . |
| 3,520,463 | 7/1970 | Ahlemeyer . |
| 3,524,779 | 8/1970 | Masters et al. . |
| 3,555,976 | 1/1971 | Carter et al. . |
| 3,623,929 | 11/1971 | Wannamaker et al. . |
| 3,656,513 | 4/1972 | Evans et al. . |
| 3,712,534 | 1/1973 | Fienup et al. . |
| 3,724,742 | 4/1973 | Henderson . |
| 3,817,417 | 6/1974 | Edwards . |
| 3,892,351 | 7/1975 | Johnson et al. . |
| 3,946,872 | 3/1976 | Sturm . |

(List continued on next page.)

*Primary Examiner*—Gary E. Elkins
*Attorney, Agent, or Firm*—Alston & Bird LLP

[57] ABSTRACT

A method of manufacturing multi-ply tubular containers for food products is provided including the steps of applying an aqueous adhesive to a surface of a paperboard body ply and then heating the aqueous adhesive to evaporate part of the water content and render the adhesive substantially tacky. The body ply and a polymeric liner ply having a moisture barrier layer are then either fed to a shaping mandrel from opposite sides and bonded together as the container is formed on the mandrel or are first passed through a nip to adhere the liner ply to the body ply and then wrapped around the mandrel as a laminate to create the tubular container. Accordingly, an advantageous tubular container can be manufactured having a body ply formed of paperboard which is wrapped into a tubular shape to define an inner surface. The body ply defines a predetermined circumferential length before being wrapped which corresponds to one revolution of the body ply when wrapped in a tubular shape. A polymeric liner ply is adhered to the inner surface of the body ply and defines a circumferential length equal to that of the body ply prior to being wrapped. Accordingly, the liner ply is circumferentially compressed when the body ply is wrapped into the tubular shape and advantageously has a wrinkled surface finish after being wrapped which is caused by the circumferential compression of the liner ply. Another feature of the invention is a sealed composite container having an end seal formed by a pair of inner and outer beads of a heat flowable polymer forming a part of the liner and membrane-type lid.

30 Claims, 8 Drawing Sheets

5,979,748
Page 2

U.S. PATENT DOCUMENTS

| | | |
|---|---|---|
| 3,973,719 | 8/1976 | Johnson et al. . |
| 4,171,084 | 10/1979 | Smith ........................................ 229/5.5 |
| 4,171,236 | 10/1979 | Winchell et al. . |
| 4,196,841 | 4/1980 | Smith et al. . |
| 4,235,341 | 11/1980 | Martin et al. . |
| 4,280,653 | 7/1981 | Elias . |
| 4,381,848 | 5/1983 | Kahn . |
| 4,469,258 | 9/1984 | Wright et al. ........................ 229/123.1 |
| 4,519,499 | 5/1985 | Stone et al. . |
| 4,557,414 | 12/1985 | Ford et al. . |
| 4,717,374 | 1/1988 | Elias . |
| 4,865,217 | 9/1989 | Yoshimoto . |
| 4,961,513 | 10/1990 | Gossedge et al. . |
| 5,002,223 | 3/1991 | Bolte et al. . |
| 5,062,569 | 11/1991 | Hekal .................................. 220/359.3 |
| 5,076,440 | 12/1991 | Drummond . |
| 5,084,284 | 1/1992 | McDilda et al. . |
| 5,098,751 | 3/1992 | Tamura et al. . |
| 5,160,767 | 11/1992 | Genske et al. . |
| 5,167,339 | 12/1992 | Takata et al. . |
| 5,176,314 | 1/1993 | Akazawa et al. . |
| 5,205,479 | 4/1993 | Rice et al. . |
| 5,213,227 | 5/1993 | Koyama et al. . |
| 5,240,133 | 8/1993 | Thomas, Jr. . |
| 5,251,809 | 10/1993 | Drummond et al. . |
| 5,281,453 | 1/1994 | Yamada et al. ...................... 220/359.3 |
| 5,316,603 | 5/1994 | Akazawa et al. . |
| 5,326,023 | 7/1994 | Rice et al. . |
| 5,415,910 | 5/1995 | Knauf . |
| 5,829,669 | 11/1998 | Drummond et al. .................... 229/4.5 |

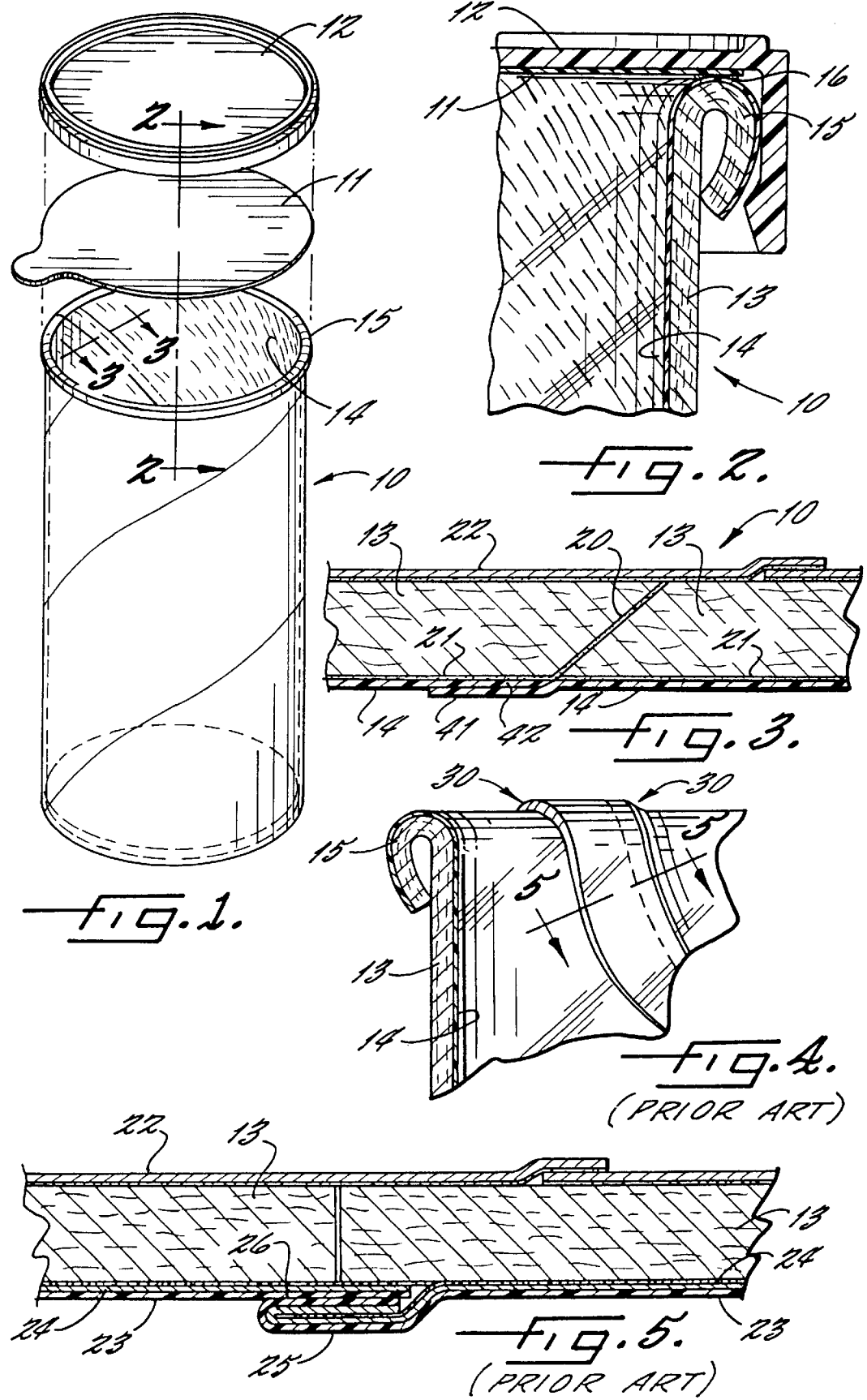

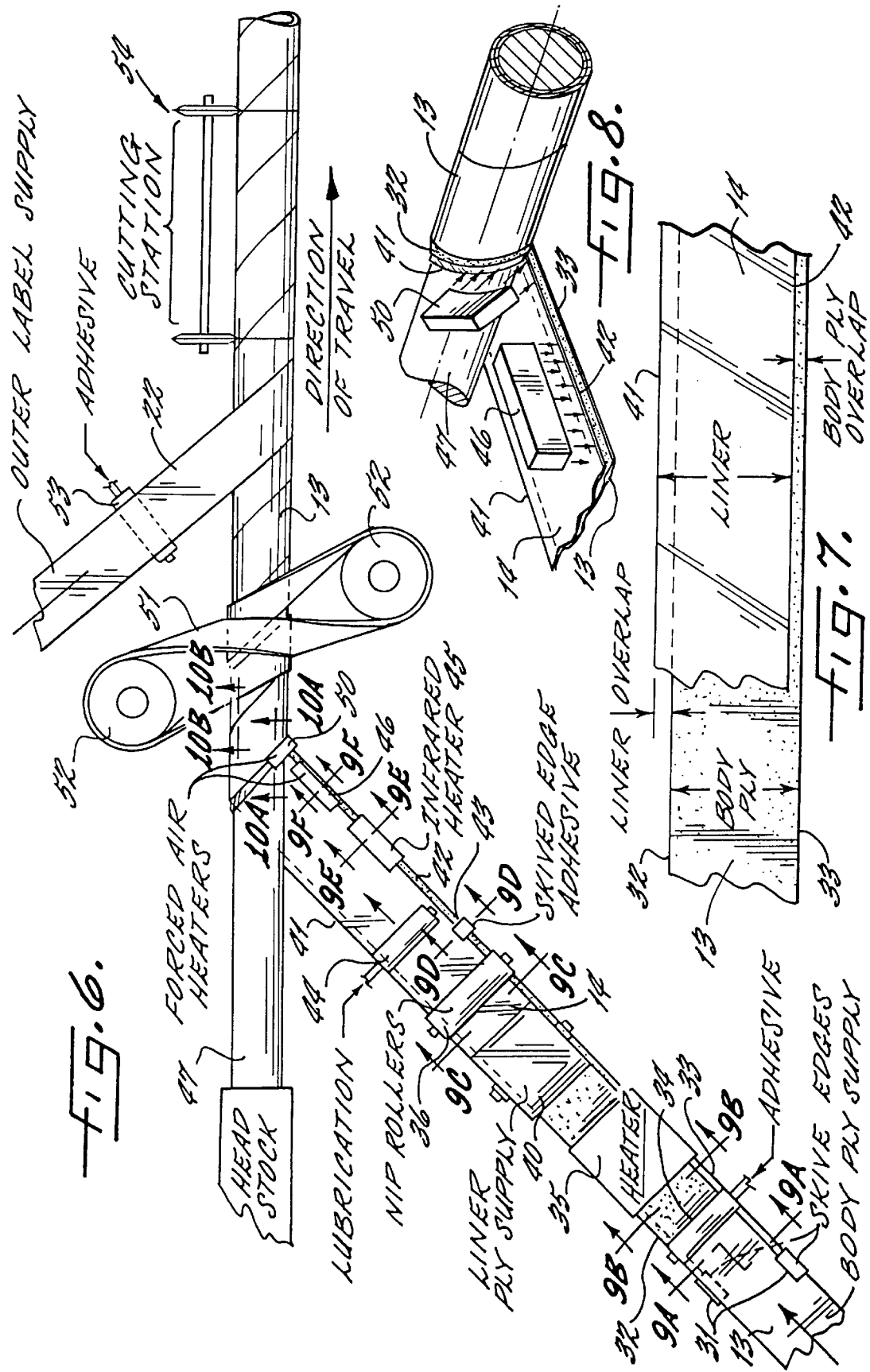

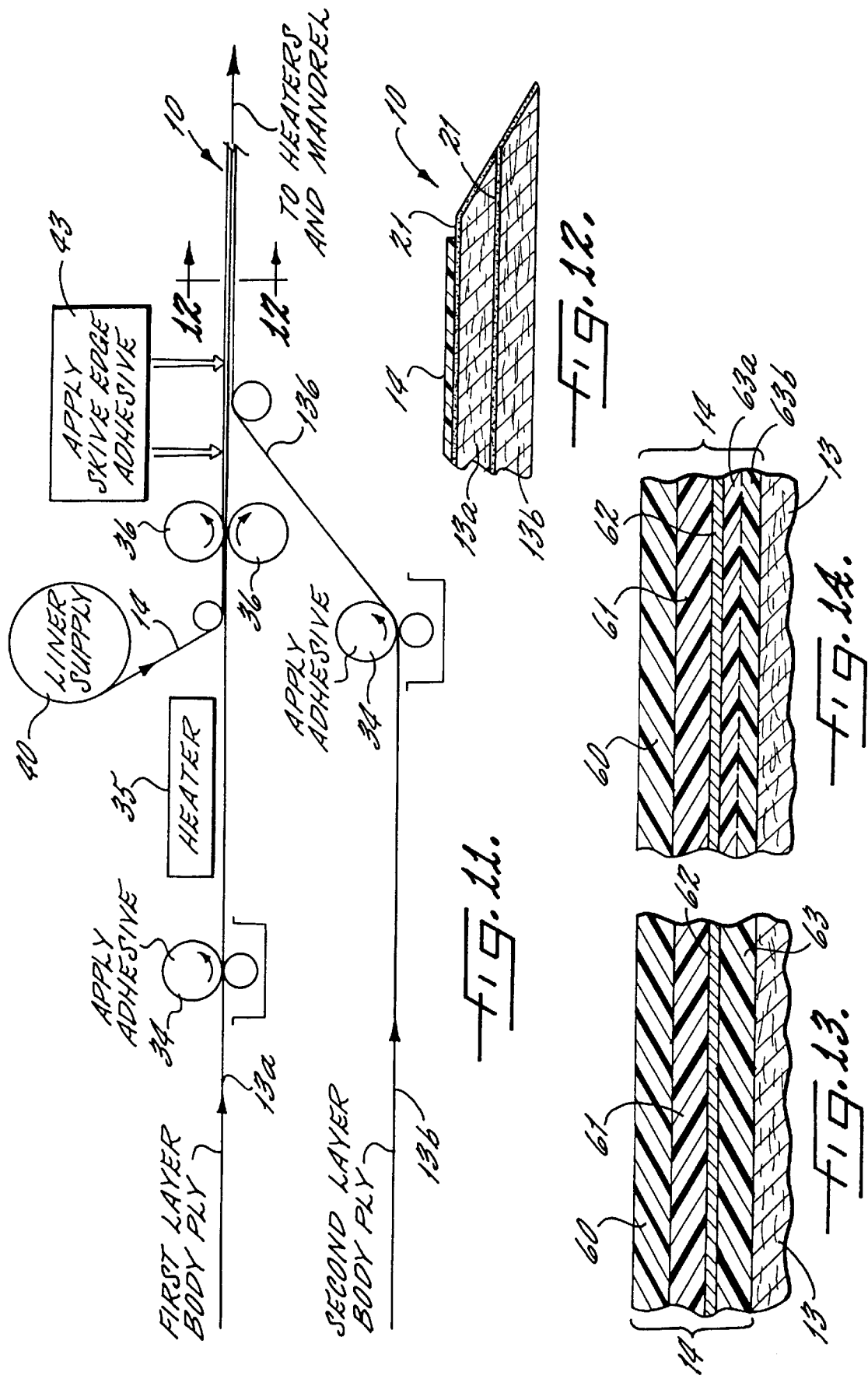

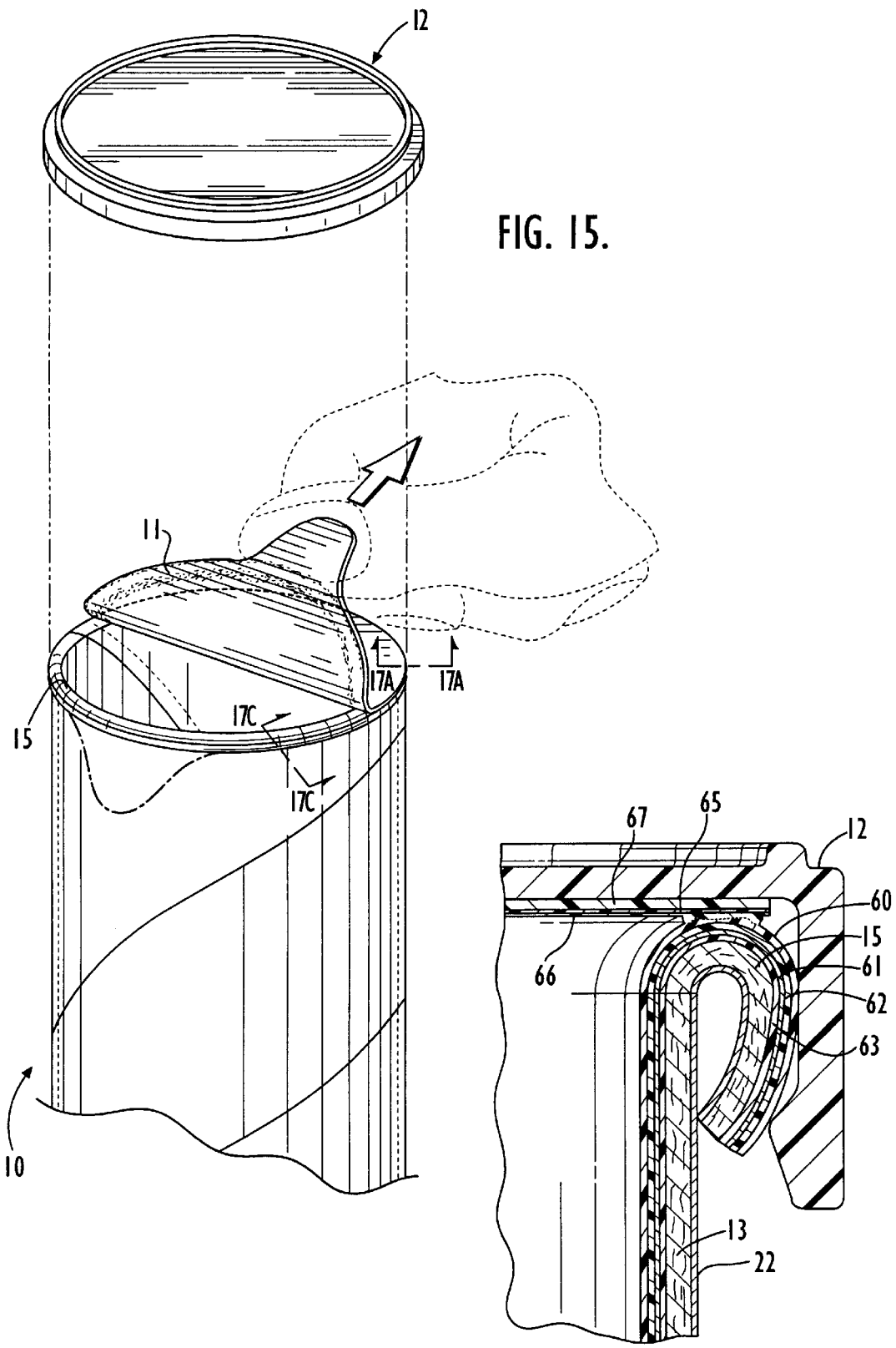

TUBULAR CONTAINER WITH A HEAT SEAL HAVING AN INNER AND OUTER BEAD AND METHOD OF MANUFACTURING SAID CONTAINER

CROSS-REFERENCE TO RELATED APPLICATIONS

This application is a continuation-in-part of application Ser. No. 08/796,793, filed Feb. 6, 1997, now U.S. Pat. No. 5,829,669 which is incorporated herein by reference.

FIELD OF THE INVENTION

The present invention relates to food containers and methods and apparatus for making food containers, and more particularly relates to tubular containers wound from at least one paperboard body ply and a liner ply.

BACKGROUND OF THE INVENTION

Food and drink products and other perishable items are often packaged in tubular containers which are sealed at both ends. These tubular containers typically include at least one structural body ply and are formed by wrapping a continuous strip of body ply material around a mandrel of a desired shape to create a tubular structure. The body ply strip may be spirally wound around the mandrel or passed through a series of forming elements so as to be wrapped in a convolute shape around the mandrel. At the downstream end of the mandrel, the tube is cut into discrete lengths and is then fitted with end caps to form the container.

Tubular containers of this type typically include a liner ply on the inner surface of the paperboard body ply. The liner ply prevents liquids such as juice from leaking out of the container and also prevents liquids from entering the container and possibly contaminating the food product contained therein. Preferably, the liner ply is also resistant to the passage of gasses, so as to prevent odors of the food product in the container from escaping and to prevent atmospheric air from entering the container and spoiling the food product. Thus, the liner ply provides barrier properties and the body ply provides structural properties.

Conventional liner plies most often include aluminum foil which has good barrier properties and also has advantageous strength properties. In particular, the liner is wound onto the mandrel prior to the winding of the body ply and must be sufficiently strong and stiff to be independently wound on the mandrel without stretching or wrinkling. Because of the support provided by the foil layer of the liner, such liners are known as "supported" liners. One or more polymeric layers are normally adhered to the foil to further improve the barrier properties of the liner and it is sometimes the case that the foil layer is not necessary for barrier properties but is included in the liner only to provide support. Such foils are expensive and thus it is desired to provide an "unsupported" liner having the requisite barrier properties without the aluminum foil layer. However, because of the problems associated with winding an unsupported liner on the mandrel, such as stretching, creasing or other misshaping of the liner, it has not been commercially feasible with conventional winding apparatus and methods to manufacture a container having an unsupported liner ply.

Another problem associated with conventional liners is excessive friction between the liner ply and the mandrel as the tubular container is wound. If the amount of friction is too high, the mandrel can suffer from overheating or premature wear. Lubricants are used although the lubricants can be expensive and may present FDA concerns. Accordingly, it would be desirable to provide a tubular container which does not create excessive friction with the shaping mandrel. In addition, the aluminum foil layer typically includes a kraft paper backing for allowing the foil layer to be adhered to the paperboard body ply. Aqueous based adhesives (or "wet adhesives") are preferably being used to adhere the liner ply to the body ply because solvent based adhesives have become disadvantageous in light of various environmental concerns. However, it has heretofore been difficult to get the aqueous adhesives to stick to the smooth and impervious surface of the aluminum foil layer. Accordingly, a kraft paper backing has been preadhered to the foil layer so that the liner can be adhered to the paperboard body ply with wet adhesives. However, the kraft paper adds further cost and thickness to the liner.

The liner ply is sealed to itself along a helical seam which is typically slightly offset from the helical seam of the body ply. Wet adhesives have typically not been able to adhere directly to the foil layer as discussed above, and thus the liner ply seam is formed with an "anaconda" fold, wherein the overlying edge of the liner ply is folded back on itself and adhered to the underlying edge. The anaconda fold allows the polymeric layers on the surface of the foil layer to be heat sealed together. Alternatively, a hot melt adhesive can be used to seal the anaconda fold of the overlying edge of the liner ply to the underlying edge. An additional advantage of the anaconda fold is that the edge of the kraft paper is not exposed to the interior of the container and thus liquids in the container will not be absorbed by the kraft paper. An example of such a fold is illustrated in U.S. Pat. No. 5,084,284 to McDilda, et al.

Anaconda folds are undesirable, however, because of their increased thickness. The thickness of an anaconda fold seam is equal to three thicknesses of the liner ply and poses difficulties when attempting to hermetically seal the ends of the tubular container. Specifically, the ends of the tube are often rolled outwardly after being cut so as to form a rolled circular bead or flange on one or both ends of the tube and then end caps or covers are sealed to the bead with an adhesive sealant or compound. However, in the area where the thick anaconda fold seam forms a portion of the edge surface, the end surface of the bead or flange can be substantially non-planar thus forming hill-like and/or valley-like irregularities. Accordingly, an extra amount of adhesive sealant must be applied to the edge surface at least in the area of the anaconda fold seam to fill the discontinuities and hermetically seal the tubular container. The additional application of adhesive sealant is disadvantageous because of the extra sealant which must be used and the increased difficulty in removing the seal by the consumer due to the additional adhesive sealant.

Prior tubular containers having a liner without an anaconda fold seam include the container disclosed in U.S. Pat. No. 3,520,463 to Ahlemeyer. The container disclosed therein includes a liner ply of aluminum foil which is coated on one surface to inhibit chemical attack. The liner ply web is fed to a pair of combining rolls where its uncoated surface is forced into contact with an adhesively coated surface of a body ply web. Solvent based adhesives are disclosed and include animal glue, casein-latex emulsion, vinyl-copolymer emulsion, and sodium silicate. The composite web is then spirally wound into tubular form about a mandrel to create a continuous tube. The overlapping edges of the liner ply are secured together with a hot melt adhesive.

In addition, current commercial containers often have membrane-type lids or end closures heat sealed to a beaded end of the composite container wall. The beaded end is formed by turning out the end of the container liner to position the inner layer of the liner material on the outwardly curved beaded surface. As noted above, the liner material has conventionally been a paper-backed foil liner which is spirally wound inside the composite container, examples of which are disclosed in U.S. Pat. No. 3,892,351 to Johnson et al. and U.S. Pat. No. 4,280,653 to Elias. The foil liner and paper backing are not inexpensive and have an undesirable thickness.

Certain types of heat sealable coatings have been used in both the lidding and liners of conventional containers. For example, SURLYN® polymer, a product of Dupont, is a material known in the art and is commonly used as a heat seal coating. SURLYN® polymer is an ionically cross-linked polymer with limited flow characteristics when heated. Typically, the layer of the container and the layer of the membrane which contact each other are constructed of SURLYN® polymer, and may be coated with a wax. These two layers of SURLYN® polymer are heat sealed along the top surface of the container bead. The two SURLYN® polymer layers create an extremely strong bond layer that remains relatively uniform in thickness across the seal area. Due to the strong cross-linked bond created by SURLYN® polymer, however, opening the container can require a peel force which is too high for some consumers and usually results in tearing and exposure of the other layers of the container wall, such as the paperboard body wall, as is illustrated in U.S. Pat. No. 4,280,653 to Elias. This gives the top of the container a ragged, undesirable appearance.

Accordingly, it would be desirable to provide methods and apparatus for manufacturing a tubular container having an unsupported liner ply which does not include a foil layer. In addition, it would be highly desirable to provide such a container wherein the liner ply is securely adhered to the body ply with an aqueous adhesive. Such an aqueous adhesive would avoid the problems associated with solvent adhesives but should be capable of forming a sufficiently strong bond with the liner ply, a construction which has not yet been commercially feasible. In addition, it would be advantageous if the liner ply could be sealed without using an anaconda fold seam. A tubular container which could be wound without generating excessive friction with the shaping mandrel would also be very desirable.

It would also be advantageous to provide a sealed container and a method for sealing a container that combine ease of opening and an attractive appearance after opening with the seal strength and barrier properties required for protection of the products within the container.

SUMMARY OF THE INVENTION

These and other objects and advantages are met by the present invention which include methods and apparatus for manufacturing a tubular container having a paperboard body ply and a polymeric liner ply adhered thereto with a wet adhesive. In particular, the advantageous method according to the present invention includes the steps of applying an aqueous adhesive to a paperboard body ply and then heating the aqueous adhesive to evaporate at least part of the water content to render the adhesive substantially tacky. After the heating step, the paperboard body ply and a polymeric liner ply are preferably bonded together during the construction of the tubular container by winding the body ply and the liner ply around a shaping mandrel from opposite sides. Alternatively, the body ply and liner ply are passed through a pair of nip rollers to adhere the liner ply to the body ply. The body ply and the adhered liner ply are then wrapped around the shaping mandrel to create the tubular container. The body ply may be wrapped helically around the mandrel to create a spirally wound tube or wrapped longitudinally around the mandrel to create a convolute tube.

Preferably, the heating step includes subjecting the adhesive to at least about 100,000 $J/m^2$ and more preferably at least about 460,000 $J/m^2$. A sufficient amount of heat can be imparted by advancing the body ply adjacent to a heat source having the capability of generating a heat flux of at least about 50,000 $W/m^2$ for a period of less than about 3 seconds. This amount of heat will raise the temperature of the paperboard above the boiling point of water to evaporate part of the water content from the aqueous adhesive.

Another advantageous method includes advancing a continuous polymeric liner ply having first and second marginal edge portions and an adhesive layer on the first marginal edge portion of the surface of the liner ply facing the body ply. The adhesive layer includes a non-aqueous polymeric adhesive which is activated at a predetermined activation temperature. The liner ply and body ply are then passed through a pair of nip rollers and are aligned such that the first marginal edge portion of the liner ply extends beyond a first edge of the body ply.

The body ply and adhered liner ply are wrapped around the shaping mandrel and the non-aqueous adhesive layer of the liner ply is heated to a temperature above the activation temperature of the adhesive. Heating of the non-aqueous adhesive layer occurs prior to the body ply and liner ply being wrapped around the shaping mandrel, or while the plies are wrapped on the shaping mandrel, or both. The body ply is further wrapped around the shaping mandrel so that the second marginal edge portion of the liner ply is adhered to the first marginal edge portion by the non-aqueous adhesive layer, thus creating a sealed liner. Advantageously, the mandrel may also be heated.

An apparatus for manufacturing multi-ply tubular containers for food products having a paperboard body ply and an inner polymeric liner ply also forms a part of the invention. The apparatus includes a supply of continuous body ply material and an adhesive applicator adjacent to one surface of the body ply for applying an aqueous adhesive to that surface. The apparatus further includes at least one heat source downstream of the adhesive applicator for heating the aqueous adhesive and which is capable of evaporating enough water to render the adhesive substantially tacky. Preferably, the heat source comprises an infrared heater capable of generating heat flux of at least about 50,000 $W/m^2$.

The apparatus also includes a supply of continuous liner ply material and a pair of nip rollers through which the liner ply and the body ply are passed to adhere the liner ply to the body ply. In a preferred embodiment, a corona discharge element is positioned adjacent to the surface of the liner ply to promote adhesion to the body ply. The body and liner plies are wrapped around a shaping mandrel downstream of the nip rollers to form the body and liner plies into the desired tubular shape. A cutting station adjacent to the mandrel cuts the thus formed wound tube into discrete container lengths.

According to another aspect of the invention, the liner ply has a substantially smooth surface prior to the body ply being wrapped but has a wrinkled surface after being wrapped which is caused by circumferential compression of the liner ply. The peaks and valleys of the wrinkled surface cause the liner ply to move easily over the shaping mandrel, thus advantageously decreasing friction between the liner ply and the mandrel and eliminating problems of premature wear and overheating associated with conventional containers.

The body ply defines a predetermined circumferential length before being wrapped corresponding to one revolution of the body ply around the shaping mandrel when wrapped in the tubular shape. The liner ply is adhered to the inner surface of the body ply and defines a circumferential length which is equal to that of the body ply prior to being wrapped. Accordingly, the liner ply is circumferentially compressed when the body ply is wrapped into the tubular shape and the wrinkled surface is created.

The barrier layer preferably includes a layer of polyester having at least one metallized surface. In addition, the liner ply preferably has a thickness of less than about 3 mils. According to another embodiment, a second paperboard ply may be adhered to the first body ply opposite the liner ply for added strength.

An advantageous sealed container is also provided by the invention which allows a strong hermetic membrane-type seal, but which does not tear through the underlying layers when the membrane is removed. The seal is formed in part by a pair of inner and outer "beads" of a heat flowable polymer forming a part of the liner and membrane-type lid. In particular, a sealed composite container for products is provided having a tubular body member comprising at least one paperboard body ply and a polymeric liner ply adhered to the inner surface of the tubular body member. The polymeric liner ply preferably comprises a barrier layer and a seal layer, wherein the seal layer defines the innermost surface of the liner ply and comprises a heat flowable polymer. The barrier layer of the liner ply is adhered to the body ply with a predetermined bond strength. At least one end of the body member is preferably rolled outwardly to form a flange and expose the seal layer of the liner ply. The sealed composite container for products also includes a lid for closing the flanged end of the tubular body member, wherein the lid comprises a barrier layer and a seal layer.

The seal layer of the lid is positioned adjacent to the seal layer of the liner ply on the flange and is also comprised of a heat flowable polymer. The two seal layers are adhered together under heat and pressure to form a heat seal between the lid and the liner ply. Advantageously, the heat seal has an inner bead formed of the heat flowable polymers of the seal layers and facing the interior of the container and an outer bead formed of the heat flowable polymers on the opposite side of the heat seal from the inner bead. The heat seal further comprises a thin intermediate region between the inner and outer beads having a lower bond strength than the inner and outer beads. The intermediate region of the heat seal may even become discontinuous such that the respective barrier layers are in abutting contact.

The heat seal provides a bond strength between the barrier layer of the lid and the barrier layer of the liner ply that is less than the bond strength between the barrier layer of the liner and the tubular body member behind the barrier layer of the liner. Accordingly, when the container is opened, shearing occurs only between the barrier layers (either between the adjacent seal layers or between one of the seal layers and the adjacent barrier layer) and not through the barrier layers. The present invention thus avoids the undesirability of tearing through and/or exposing the paperboard body ply of the tubular body member.

Preferably, the lid seal layer has a lower melting point than the liner seal layer. Specifically, the melting point of the seal layer of the lid is between about 105° C. to about 130° C. and the melting point of the seal layer of the liner is between about 120° C. and 130° C. Most preferably, the melting point of the seal layer of the lid is between about 105° C. to about 125° C. and the melting point of the seal layer of the liner is between about 125° C. and 130° C.

The heat seal has a minimum tensile strength of about 1 lb/linear inch when pulled at a 90 degree angle relative to the top surface of the sealed container and parallel to the axis of the can. The preferred range for tensile strength is about 8 to about 12 lbs/linear inch to prevent failure of the seal at high altitude. The heat seal also has a minimum peel strength of about 1 lb/linear inch when pulled at a 135 to 180 degree angle. The preferred range for peel strength is about 5 to about 10 lbs/linear inch.

The liner seal layer is preferably constructed of a material selected from the group consisting of high density polyethylene, low density polyethylene, metallocenes and mixtures thereof. The lid seal layer is preferably constructed of a material selected from the group consisting of ethylene vinyl acetate, high density polyethylene, low density polyethylene, ethyl methyl acrylate, metallocenes and mixtures thereof. The barrier layers of the lid and liner are preferably constructed of polyester. Most preferably, the polyester used in the barrier layers is selected from the group consisting of polyethylene terephthalate, modified polyethylene terephthalate, polyethylene napthalate and mixtures thereof. The barrier layers may also be constructed of metallized polyethylene terephthalate, metallized modified polyethylene terephthalate, metallized polyethylene napthalate, metallized polypropylene, metal oxide and silicate coated polyester, metal oxide and silicate coated polypropylene, ethylene vinyl alcohol and mixtures thereof.

A method of manufacturing a sealed container for products is also provided. The method includes providing a tubular body member having at least one paperboard body ply and adhering a polymeric liner ply to the inner surface of the tubular body member. Advantageously, the liner ply has a barrier layer and a seal layer with the seal layer defining the innermost surface of the liner ply and comprising a heat flowable polymer. At least one end of the tubular body member is rolled outwardly to form a flange and expose the seal layer. The method also includes providing a lid for closing the flanged end of the tubular body member. Advantageously, the lid has a barrier layer and a seal layer with the seal layer comprising a heat flowable polymer. The method further includes contacting the seal layers of the liner ply and the seal layer of the lid and heating and pressing the seal layers together to form an inner and an outer bead of seal layer material with a thinner intermediate region of seal layer material therebetween. As a result, the lid and the liner ply are hermetically sealed. The heat seal material comprises a blend of the heat flowable polymers of the two seal layers. Preferably, the pressing is accomplished by pressing the lid and the tubular body member together using a heat sealing head.

BRIEF DESCRIPTION OF THE DRAWINGS

Some of the objects and advantages of the present invention having been stated, others will appear as the description proceeds when taken in conjunction with the accompanying drawings, which are not necessarily drawn to scale, wherein;

FIG. 1 is an exploded perspective view of a tubular container according to the present invention;

FIG. 2 is a fragmentary and enlarged sectional view of an end of the tubular container taken along lines 2—2 of FIG. 1;

FIG. 3 is an enlarged sectional view of a paperboard body ply and a polymeric liner ply taken along lines 3—3 of FIG. 1;

FIG. 4 is a fragmentary and enlarged sectional view of an anaconda fold seam according to the prior art;

FIG. 5 is an enlarged sectional view of the anaconda fold seam of the prior art taken along lines 5—5 of FIG. 4;

FIG. 6 is a plan view of an apparatus according to the present invention for making a tubular container;

FIG. 7 is an enlarged plan view of a section of the apparatus illustrating the alignment of the liner ply relative to the body ply;

FIG. 8 is a perspective view of a section of the apparatus illustrating the winding of the body and liner plies onto a mandrel;

FIG. 11 is a schematic elevational view of an apparatus for manufacturing a tubular container having two body plies according to another embodiment of the invention;

FIG. 12 is a fragmentary and enlarged sectional view of one edge of the body plies adhered together in the apparatus of FIG. 11;

FIG. 13 is a greatly enlarged sectional view of a liner ply according to the invention adhered to the body ply;

FIG. 14 is a greatly enlarged sectional view of a liner ply of another embodiment of the invention;

FIG. 15 is a fragmentary perspective view of a container of the present invention illustrating the opening mechanism whereby the liner ply is not torn through to the underlying paperboard;

FIG. 16 is a fragmentary and enlarged view of the sealed end of the tubular container of a preferred embodiment of the present invention illustrating inner and outer beads of heat flowable polymer;

DETAILED DESCRIPTION OF THE INVENTION

Figure 9A:
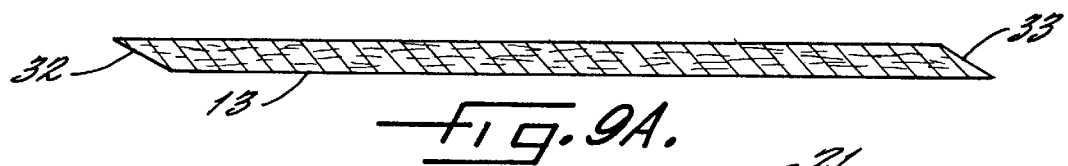
FIG. 9A is an enlarged sectional view of the body ply taken along lines 9A—9A of FIG. 6.

The present invent ion now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

A tubular container 10 according to the present invention is illustrated in FIG. 1. Although illustrated as having a circular cross section, the tube may grave any cross sectional shape which can be formed by wrapping the tube around an appropriately shaped mandrel. One example is a generally rectangular shaped tube having rounded corners.

The embodiment illustrated in FIG. 1 is particularly advantageous for packaging potato crisps and includes a flexible lid 11, also referred to as a membrane-type lid, and a reusable plastic end cap 12 over the seal. Various other end closures may be used, however, depending upon the type of food product which is to be packaged such as, for example, dough.

As illustrated in more detail in FIG. 2, the tubular container 10 includes a wall having a body ply 13 which is preferably formed of paperboard and a liner ply 14 which is preferably formed of a polymeric material adhered to the inner surface of the body ply 13. The upper end of the tubular container 10 is rolled over so as to form a bead 15 or flange. The lid 11 may be hermetically sealed to the top of the bead using a separate adhesive sealant 16. The end cap 12 is then snapped over the bead 15 and may be reused after the lid 11 has been removed. A metal closure (not illustrated) can be secured to the opposite end of the container 10.

The seams where the various plies are joined together are illustrated in FIG. 3. The paperboard body ply 13 is made of a relatively thick and stiff paperboard. Accordingly, the edges are first skived and then joined together during the tube forming process with an adhesive 20 to create a strong seam. The liner ply 14 is adhered to the inner surface of the body ply 13 with a wet adhesive 21 and the overlapping edges of the liner ply are adhered together to ensure that the container 10 is completely sealed. A label ply 22 is preferably adhered to the outer surface of the body ply 13 having various indicia printed thereon regarding the product within the container.

FIGS. 4 and 5 illustrate conventional tubular containers which include a liner having an aluminum foil layer 23 for providing strength and barrier properties to the liner. As discussed above, because conventional wet adhesives have been unable to adhere to aluminum foil, a kraft paper layer 24 is preadhered to the aluminum foil layer 23.

The kraft paper layer 24 cannot be exposed to the interior of the container because liquids and gasses could pass through the porous and absorbent kraft paper layer. For example, if a straight lap seam, such as that shown in FIG. 3, were employed at the edges of the liner 14, one edge of the kraft paper layer 24 would be exposed and would cause liquids in the container to wick through the kraft paper layer and leak from the container. Accordingly, an anaconda fold must be used at the seam wherein an overlying edge portion 25 of the liner is folded back on itself and then sealed to an underlying edge portion 26 of the liner as illustrated in FIG. 5. The overlying liner edge portion 25 may be adhered to the underlying liner edge portion 26 by way of a hot melt adhesive (not shown). Alternatively, the aluminum foil layer 23 most often includes a thin polymeric layer (not shown) on the surface thereof facing the interior of the container which can be heat sealed to itself at the point where the overlying liner edge portion 25 contacts the underlying liner edge portion 26.

One disadvantage of such a liner arises at the point where the anaconda fold seam extends over the bead 15 as illustrated in FIG. 4. Specifically, the thick anaconda fold seam creates a pair of step discontinuities 30 along the periphery of the bead 15. This presents difficulties when sealing the lid 11 to the bead 15 and is typically overcome by applying extra adhesive sealant 16 to the lid or the bead to fill the discontinuities 30. The use of this added adhesive sealant 16 is disadvantageous because of the expense of the extra material used and the complexity of applying added sealant to those areas.

Figure 18:
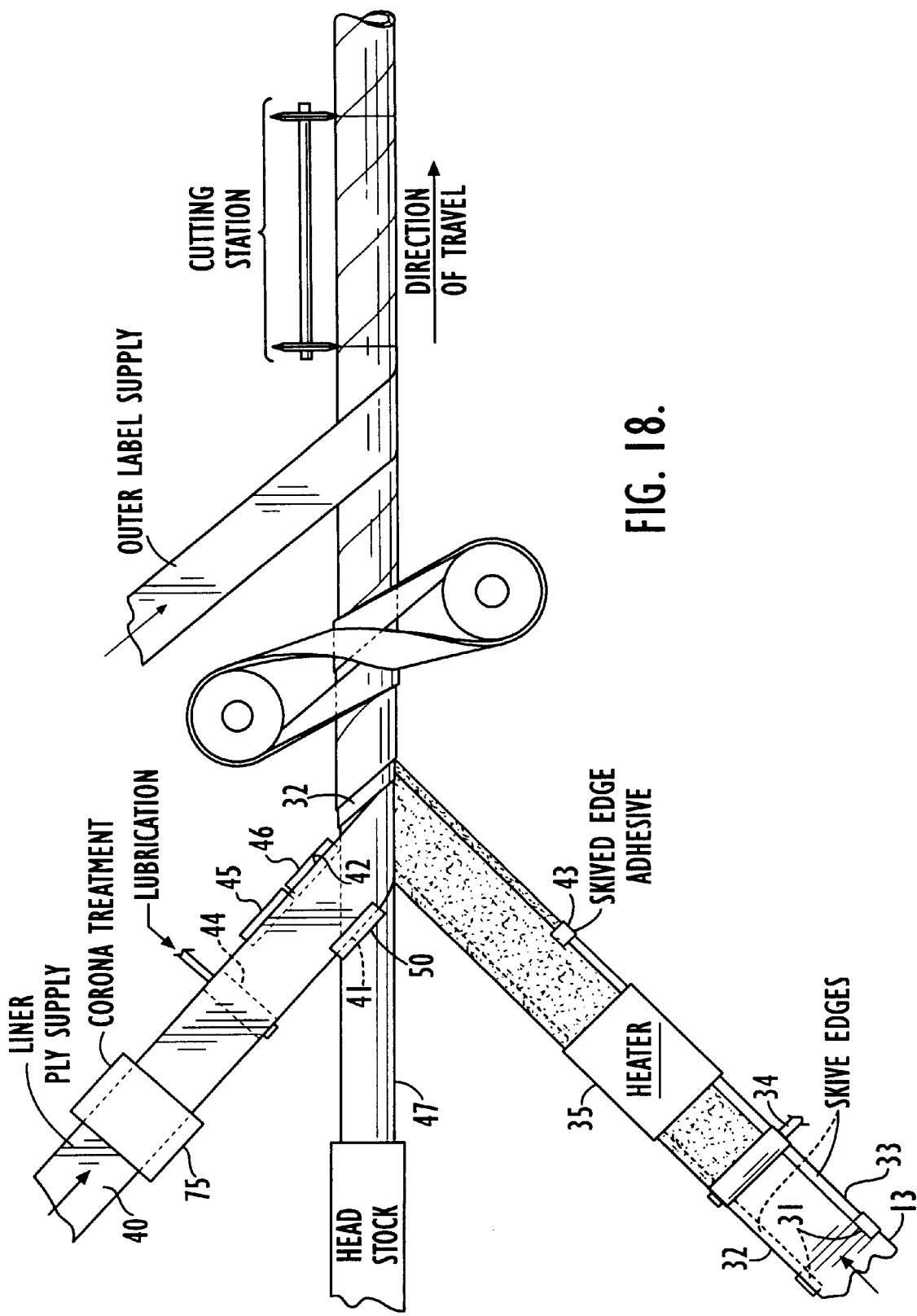
FIG. 18 is a plan view of a preferred embodiment of an apparatus according to the present invention for making a tubular container.

Two apparatus for making tubular containers which overcome the disadvantages of conventional tubular containers are illustrated in FIG. 6 and FIG. 18. A continuous strip of paperboard body ply material 13 is supplied to the apparatus and is first passed through a pair of opposed edge skivers 31. As illustrated in FIG. 9A, the edge skivers remove part of the square edge of the body ply 13 to create first 32 and second 33 edges having a beveled configuration.

Figure 9B:
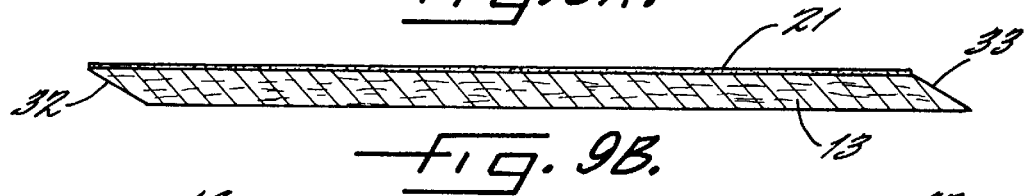
FIG. 9B is an enlarged sectional view of the body ply and an aqueous adhesive applied thereto taken along lines 9B—9B of FIG. 6.

The body ply 13 is then advanced through an adhesive applicator 34 which applies an adhesive 21 to the upper surface of the body ply 13 as illustrated in FIG. 9B. The adhesive 21 is advantageously an aqueous adhesive which overcomes the many problems associated with solvent based adhesives. No special equipment is needed to capture solvents which evaporate from the adhesive in order to comply with environmental regulations. Preferred adhesives are aqueous low glass transition temperature ethylene vinyl acetate (>18%) materials. One preferred adhesive is No. 72-4172 which is available from the National Starch and Chemical Company. Another adhesive which may be used is No. 33-4060 which is also available from the National Starch and Chemical Company.

The body ply 13 and wet adhesive 21 applied thereto are then passed underneath a heater 35 which evaporates at least part of the water content of the aqueous adhesive 21 to render the adhesive substantially tacky. It is important that the correct amount of heat is supplied to the adhesive. Insufficient heat will not evaporate enough water in a sufficiently short period of time with the result that the adhesive will not be rendered sufficiently tacky. Conversely, too much heat will overdry the adhesive and cause the adhesive to lose tackiness. It has been discovered that at least about 100,000 $J/m^2$ is an appropriate amount of heat to render the wet adhesive tacky. More particularly, heating the adhesive with at least about 460,000 $J/m^2$ is preferred. It has been determined that, if the body ply 13 is moving at a speed of about 50 feet per minute (or is heated for less than about 3 seconds), heating the adhesive 21 with a heater 35 having a heat flux of 200,000 $W/m^2$ will raise the temperature of the paperboard body ply 13 to at least the boiling point of water (212° F. at sea level), and as high as 320° F. It will be understood by one of ordinary skill in the art, however, that these parameters may change depending on various factors including the efficiency of the heat source, the speed of the body ply (line speeds up to an average of 400ft./min. have been achieved) and the type of adhesive used. Accordingly, a sufficient amount of heat is that which causes the adhesive to become tacky in a short period of time without being overdried. A preferred type of heat source is an infrared heater although various other heat sources, e.g., forced air heating or the like can be used.

After heating the adhesive 21 on the body ply 13, FIG. 18 illustrates an alternative preferred method of bonding the polymeric liner ply 14 to the body ply 13 and constructing the tubular container 10 therewith. As shown, the body ply 13 and the liner ply 14 are fed to the shaping mandrel from opposite directions. The body ply 13 is passed under a skive adhesive applicator 43 which applies the skive adhesive 20 to the beveled surface of the skived second edge 33 of the body ply 13. The skive adhesive 20 is preferably a hot melt adhesive of the type which is conventional in the art although it could also be a water based adhesive including one or more polymers. Polyvinyl acetate and ethylene vinyl acetate are the preferred liquid adhesives. The skive adhesive 20 helps provide a stronger body ply bond especially for single body ply containers.

The surface of the liner ply 14 that contacts the body ply 13 is subjected to a corona treatment station 75. The opposite surface of liner ply 14 is coated with lubricant from a roller 44 which allows the liner ply to slide smoothly during the winding operation.

The liner ply 14 is then passed under an infrared heater 45 which heats the second marginal edge portion 42 of the liner ply. After the infrared heater 45, the second marginal edge portion 42 of the liner ply 14 is then passed under at least one forced air heater 46.

The body ply 13 and the liner ply 14 are then wrapped around a shaping mandrel 47 from opposite sides of the mandrel. Each ply is first wrapped under the mandrel 47 and then back over the top in a helical fashion with the liner ply 14 wound against the surface of the mandrel. The first marginal edge portion 41 of the liner ply 14 is exposed on the mandrel 47 and is subjected to heat from a second forced air heater 50.

As the body ply 13 is further wrapped and the first edge 32 of the body ply 13 advances back under the mandrel 47 after one complete revolution, it is brought into contact with the second edge 33 of the ensuing portion of the body ply 13 which is first coming into contact with the mandrel. The skived edges 32, 33 become abutted together and the skive adhesive 20 adheres the edges together to form a spirally wound tube which advances along the mandrel 47.

Figure 10A:
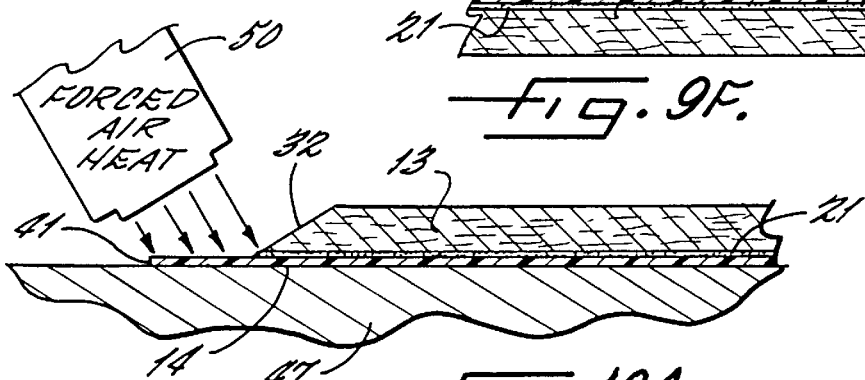
FIG. 10A is a fragmentary and enlarged sectional view of the edge of the body ply opposite the edge illustrated in FIGS. 9A–9F illustrating the application of forced air heat and taken along lines 10A—10A of FIG. 6.
Figure 10B:
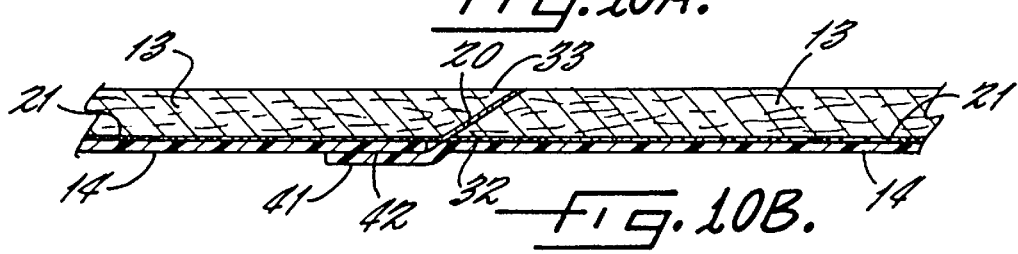
FIG. 10B is a fragmentary and enlarged sectional view of adjacent body and liner plies illustrating the seams between the plies.

With regard to the liner ply 14, the first marginal edge portion 41 is brought into an overlapping relationship with the second marginal edge portion 42 to create a sealed straight lap seam as illustrated in FIG. 10B. The seal is formed by a polymeric adhesive layer 63 of the first marginal edge 41 becoming bonded to the second marginal edge 42. However, a strip of hot melt adhesive or aqueous adhesive could alternatively be used for securing and sealing the liner overlap.

FIG. 6 illustrates an alternative method of bonding the body ply 13 to the polymeric liner ply 14. As shown, after the heater 35, the body ply 13 is then advanced into a pair of opposed nip rollers 36. A continuous strip of liner ply material 14 is fed from a reel 40 and is also advanced into the nip adjacent to the adhesive surface of the body ply 13. The wet adhesive 21 is substantially tacky and thus instantaneously bonds to the liner ply 14 without sliding as they are nipped together.

Figure 9C:
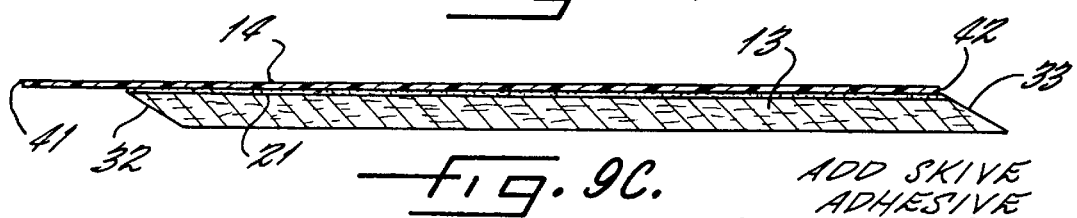
FIG. 9C is an enlarged sectional view of the body ply and the polymeric liner ply adhered thereto and taken along lines 9C—9C of FIG. 6.
Figure 9D:
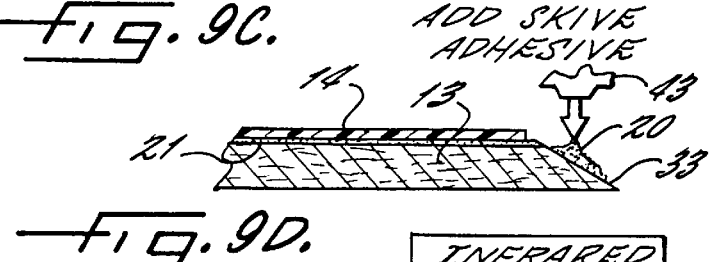
FIG. 9D is a fragmentary and enlarged sectional view of one edge of the body ply illustrating the application of a skived edge adhesive taken along lines 9D—9D of FIG. 6.

The liner ply 14 is aligned through the nip with the body ply 13 such that a first marginal edge portion 41 of the liner ply extends beyond the first edge 32 of the body ply. The liner ply 14 may have the same width as the body ply 13 and thus the opposite second marginal edge portion 42 of the liner ply does not extend all the way to the second edge 33 of the body ply. Alternatively, the liner ply 14 may be wider or narrower than the body ply 13 depending on the amount of liner overlap which is desired. This configuration can be seen in the plan view of FIG. 7 and the sectional view of FIG. 9C.

After the nip rollers 36, the body ply 13/liner ply 14 laminate is passed under a skive adhesive applicator 43 which applies the skive adhesive 20 to the beveled surface of the skived second edge 33 of the body ply 13. The skive adhesive 20 is preferably a hot melt adhesive of the type which is conventional in the art although it could also be an other polymeric-type adhesive. Liquid polyvinyl acetate and ethylene vinyl acetate are the preferred adhesives. The skive adhesive 20 helps provide a stronger body ply bond especially for single body ply containers.

The surface of the liner ply 14 may then be coated with lubricant from a roller 44 which allows the liner 14 to slide smoothly during the winding operation. If making the embodiment of the container discussed below, however, the lubricant can be advantageously eliminated or greatly reduced.

Figure 9E:
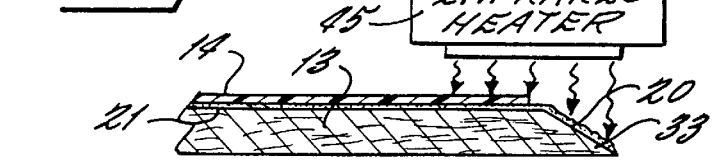
FIG. 9E is a fragmentary and enlarged sectional view illustrating the application of infrared heat to the edge of the body ply taken along lines 9E—9E of FIG. 6.
Figure 9F:
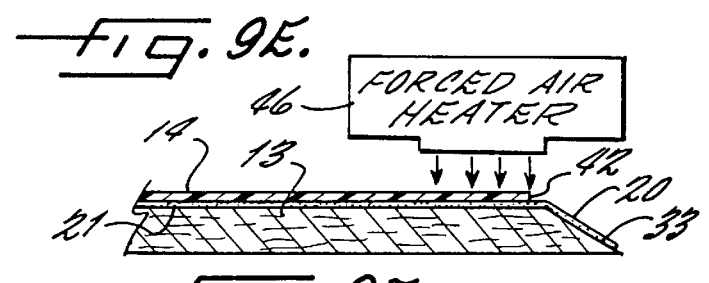
FIG. 9F is a fragmentary and enlarged sectional view of the body ply illustrating the application of forced air heat to the edge of the body ply taken along lines 9F—9F of FIG. 6.

The laminate is then passed under an infrared heater 45 which heats the second marginal edge portion 42 of the liner ply 14 and also may heat the second edge 33 of the body ply 13, as can be seen in FIG. 9E. An infrared heater capable of generating a heat flux of at least about 83,000 W/m$^2$ has been determined to be sufficient. After the infrared heater 45, the second marginal edge portion 42 of the liner ply 14 is then passed under at least one forced air heater 46.

The body ply 13/liner ply 14 laminate is then wrapped around a shaping mandrel 47. The laminate is first wrapped under the mandrel 47 and then back over the top in a helical fashion with the liner ply 14 wound against the surface of the mandrel. The first marginal edge portion 41 of the liner ply 14 is exposed on the mandrel 47 and is subjected to heat from a second forced air heater 50 as can been seen in FIGS. 8 and 10A. As the laminate is further wrapped and the first edge 32 of the body ply 13 advances back under the mandrel 47 after one complete revolution, it is brought into contact with the second edge 33 of the ensuing portion of the body ply 13 which is first coming into contact with the mandrel. The skived edges 32, 33 become abutted together and the skive adhesive 20 adheres the edges together to form a spirally wound tube which advances along the mandrel 47. With regard to the liner ply 14, the first marginal edge portion 41 is brought into an overlapping relationship with the second marginal edge portion 42 to create a sealed straight lap seam as illustrated in FIG. 10B. The present invention can thus eliminate the disadvantages associated with anaconda fold seams by using a straight overlapping seam instead.

A preferred liner construction is illustrated in FIGS. 13 and 14 and includes a seal layer 60, a moisture barrier layer 61 and an adhesive layer 63. The barrier layer 61 is resistant to the passage of liquids and gasses such as oxygen. If a high barrier is required for both liquids and gasses, preferred barrier materials are metallized polyester or metallized polypropylene. Some food products, however, do not require a gas barrier, such as various juices, and other barrier materials may be used (although the barrier may also be generally resistant to the passage of gasses). It will be understood that various barrier materials or properties could be employed depending upon the item being packaged.

Alternative barrier materials include nylon, EVOH (ethylene vinyl alcohol polymer and copolymer), polyvinylidene chloride, polyethylene, polypropylene, metallized polypropylene, metal oxide and silicate coated polyester, metal oxide and silicate coated polypropylene and the like as will be apparent to the skilled artisan. One surface of the barrier layer 61 may include a thin metallized coating 62 to provide a metallic appearance and also to enhance the barrier properties. The metallized coating 62, which may be formed of aluminum, is significantly thinner than a foil layer, however, and is not necessary for strength or barrier properties in certain applications. Thus, a thick and expensive foil sheet layer is advantageously eliminated. The liner ply 14 preferably has a total thickness less than about 3 mils and is more preferably closer to 1 mil. in thickness.

An adhesive layer 63 is below the metallized coating 62 and defines the outer surface of the liner ply 14. The adhesive layer 63 includes a non-aqueous polymeric adhesive which is activated at a predetermined activation temperature. Such adhesives, which are also known as "dry-bond" adhesives, can include one or more of the following polymers or modified copolymers thereof; ethylene vinyl acetate, ethylene acrylic acid, ethylene methacrylic acid, ethylene methyl acrylate, ethylene butyl acrylate, metallocenes and blends with each other or lower cost polyolefins. A preferred embodiment is illustrated in FIG. 14 and includes an adhesive layer having two sublayers 63*a, b* which are coextruded together. The inner sublayer 63*a* is preferably ethylene acrylic acid which adheres well to the polyester barrier layer 61 and the outer sublayer 63*b* is preferably ethylene methyl acrylate which adheres well to the paperboard body ply 13. The adhesive layer 63 is manufactured as part of the liner ply 14 and, because of the adhesiveness of the wet adhesive 21, is preferably formed on only the first marginal edge portion 41 of the liner ply. A liner ply 14 wherein the adhesive layer 63 extends across the entire width of the liner such that the wet adhesive 21 is eliminated and the liner ply is adhered directly to the body ply 14 is disclosed in copending U.S. patent application Ser. No. 08/796,912, filed Feb. 6, 1997, which is assigned to the assignee of the present invention and is incorporated herein by reference.

A seal layer 60 may also form a part of the liner ply 14 and defines the inner surface of the liner ply. The seal layer 60 provides a surface against which the adhesive layer 63 is adhered when the first marginal edge portion 41 of the liner ply 14 is brought into an overlapping relationship with the second marginal edge portion 42. The seal layer 60 includes a polyolefin polymer which is preferably high density polyethylene or high density polyethylene blends containing up to 30% low density polyethylene.

One advantageous feature of the seal layer 60 is that it has a higher melting temperature than the adhesive layer 63. As noted above, the first marginal portion 41 of the liner ply 14 is raised to a temperature (whether heated before reaching the mandrel 47 or while on the mandrel 47) such that the adhesive layer 63 is activated. However, if the seal layer 60 was made of the same polymer as the adhesive layer 63 or had a melting temperature equal to or less than the melting temperature of the adhesive layer, the seal layer would be melted and inclined to stick to the mandrel 47, which would greatly impede the winding process. This problem would be especially acute with the apparatus according to the present invention because the mandrel 47 is preferably heated to minimize heat loss from the liner ply 14 to the mandrel. The present invention does not suffer from this problem, however, because the seal layer 60 has a melting temperature higher than the activation temperature of the adhesive layer 63.

The tube is then advanced down the mandrel 47 by a conventional winding belt 51 which extends around a pair of opposed pulleys 52. The winding belt 51 not only rotates and advances the tube, but also applies pressure to the overlapping edges of the body ply 13 and liner ply 14 to ensure a secure bond between the respective ply edges.

An outer label ply 22 is then preferably passed over an adhesive applicator 53 and wrapped around the body ply 13. The label ply 22 could be applied before the winding belt 51. At a cutting station 54, the continuous tube is cut into discrete lengths and removed from the mandrel 47.

The ends of the containers 10 are then rolled outwardly to form the bead 15 or a flange. Another advantageous feature of the polymeric liner ply according to the present invention is that the elasticity of the polymer causes the bead 15 to be locked in place once rolled. Conventional inelastic foil liners may have a tendency to unroll the bead 15 or crack which can present a problem when sealing the ends. Thus, with the liner of the present invention, "tighter" beads or flanges having reduced radii of curvature can be formed.

After being filled with the food product, a lid 11 preferably is sealed on one or both ends of the container 10. The unsupported liner ply 14 according to the present invention is significantly thinner than conventional foil liners and a straight lap seam can be used instead of an anaconda fold seam. Accordingly, much smaller discontinuities are presented at the point where the seam crosses the bead, and the lid 11 can be cheaply and easily sealed to the bead 15 with a minimum amount of adhesive sealant 16. An end cap 12 can then be placed over the lid 11.

FIGS. 15–17C illustrate further desirable features of the invention relating to the seal at the end of the container with the lid. The lid 11 is constructed of multiple layers. Optionally, the layer disposed on the outermost surface of the lid 11 away from the inside of the tubular container 10 is a paperboard layer 67. A barrier layer 65 is also provided that serves as a barrier to the passage of liquids and/or gases such as oxygen. If a barrier is required for both liquids and gases, the barrier material is preferably selected from the group consisting of polyethylene terephthalate, modified polyethylene terephthalate, polyethylene napthalate, metallized polyester or metallized polypropylene and mixtures thereof. The barrier layer may also be constructed of metal oxide and silicate coated polyester, metal oxide and silicate coated polypropylene, ethylene vinyl alcohol and mixtures thereof.

Advantageously, the lid 11 further includes a seal layer 66 comprised of a heat flowable polymer and positioned such that the seal layer 66 of the lid 11 is adjacent to the seal layer 60 of the liner ply 14. The seal layer 66 of the lid 11 is preferably constructed of a material selected from the group consisting of ethylene vinyl acetate, high density polyethylene, low density polyethylene, ethyl methyl acrylate, metallocenes and mixtures or blends thereof. The seal layer 66 of the lid 11 preferably has a melting point within the range of about 105° C. and 130° C. Most preferably, the melting point of the seal layer 66 is between about 105° C. and 125° C.

For purposes of this embodiment, the seal layer 60 of the liner ply 14 is preferably constructed of a material selected from the group consisting of high density polyethylene, low density polyethylene, metallocenes and mixtures or blends thereof. The seal layer 60 of the liner ply 14 preferably has a melting point within the range of about 120° C. and about 130° C. Most preferably, the seal layer 60 has a melting point between about 125° C. and 130° C.

Figure 17A:
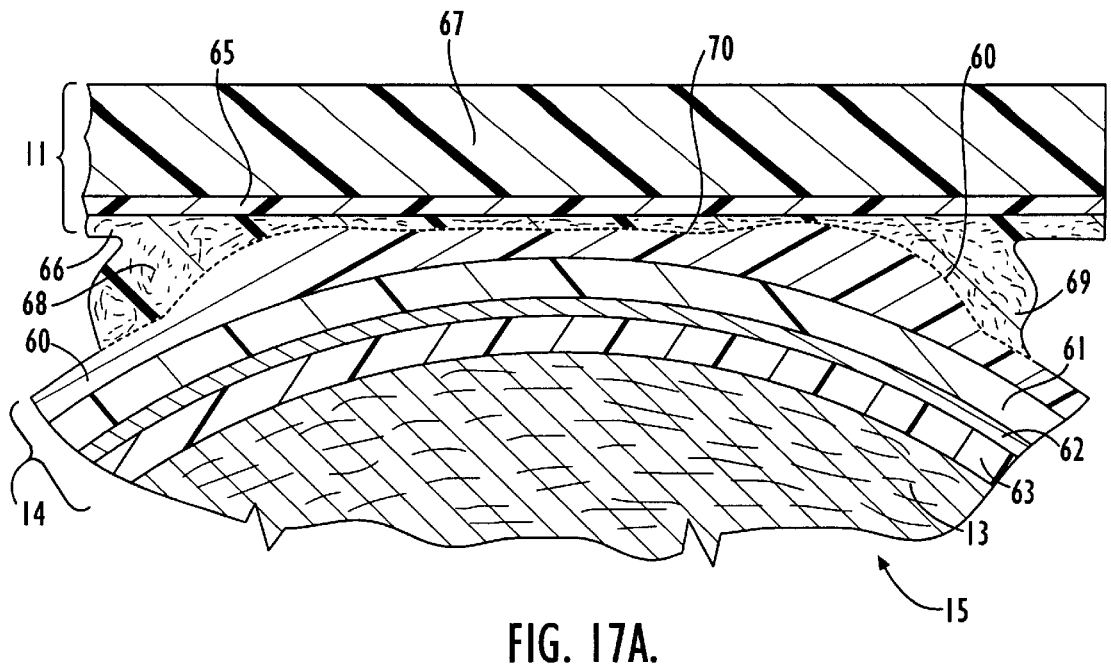
FIG. 17A is a greatly enlarged sectional view of the heat seal of the present invention taken along lines 3A—3A of FIG. 15.

FIG. 16 illustrates the sealed end of the tubular container of a preferred embodiment of the present invention wherein the seal layers, 60 and 66, are heat sealed together. As shown in FIG. 17A, this embodiment provides a sealed composite container for products having a heat seal between the liner ply 14 and the lid 11 in the form of an inner heat seal bead 68 and an outer heat seal bead 69. The inner heat seal bead 68 and the outer heat seal bead 69 are formed of the heat flowable polymers of the seal layer 60 of the liner ply 14 and the seal layer 66 of the lid 11. In particular, the seal layers 60, 66 are heated and pressed together with a heat seal head. The heat flowable polymers of both seal layers are displaced outwardly from the intermediate region and are cooled to form the beads 68, 69. The inner heat seal bead 68 faces the interior of the tubular container 10 and the outer heat seal bead 69 is disposed on the opposite side of the heat seal area from the inner heat seal bead 68. When cooled, the heat seal comprises a thin intermediate region 70 between the inner heat seal bead 68 and the outer heat seal bead 69. In certain places, the heat flowable polymers may be completely displaced from between the barrier layers 61 and 65 such that the barrier layers are in abutting contact. However, the inner and outer beads 68, 69 maintain double barriers against the passage of liquids and gases so that a hermetic seal is maintained. The intermediate region 70 preferably has a lower bond strength than the inner heat seal bead 68 and the outer heat seal bead 69. The term "bead" as used herein is intended to be distinguished from prior containers having SURLYN® polymer layers heat sealed together where very little, if any flowing of the polymers occurs. In addition, this embodiment is not limited to use with only liners having a straight overlapping seam, but the heat seal beads 68, 69 could also be used with a folded anaconda seam.

In effect, the inner heat seal bead 68 and the outer heat seal bead 69 provide a double seal having a high tensile strength. The tensile strength of the bead seals gives the container 10 a strong seal against forces acting upon the container in a direction normal to the heat seal (i.e., normal to the plane defined by the end of the tubular container 10). Since most forces acting upon a container during storage and transit will occur normal to the heat seal area, the high tensile strength of the inner heat seal bead 68 and outer heat seal bead 69 of the present invention is especially advantageous for use with product containers. The heat seal has a minimum tensile failure strength of about 1 lb/linear inch when pulled at a 90 degree angle relative to the top surface of the sealed container and parallel to the axis of the can. The preferred range for tensile failure is about 8 to about 12 lbs/linear inch to prevent failure of the seal at high altitude.

Notwithstanding the high tensile strength, the peel strength of the heat seal formed according to the present invention is relatively low, resulting in a container that exhibits relative ease of opening. This is in contrast to conventional containers where two SURLYN® polymers are ionically cross-linked together, resulting in a bond which is sufficient to tear the liner 14 when removing the lid 11 (rather than tearing through the SURLYN® polymer). The heat seal also has about a 1 lb/linear inch minimum peel failure strength when pulled at a 135 to 180 degree angle. The preferred range for peel strength is about 5 to about 10 lbs/linear inch. Thus, the heat seal of the present invention combines the tensile strength necessary to prevent unwanted breaches of the tubular container 10 with a relatively low peel strength for ease of opening by the consumer.

Figure 17B:
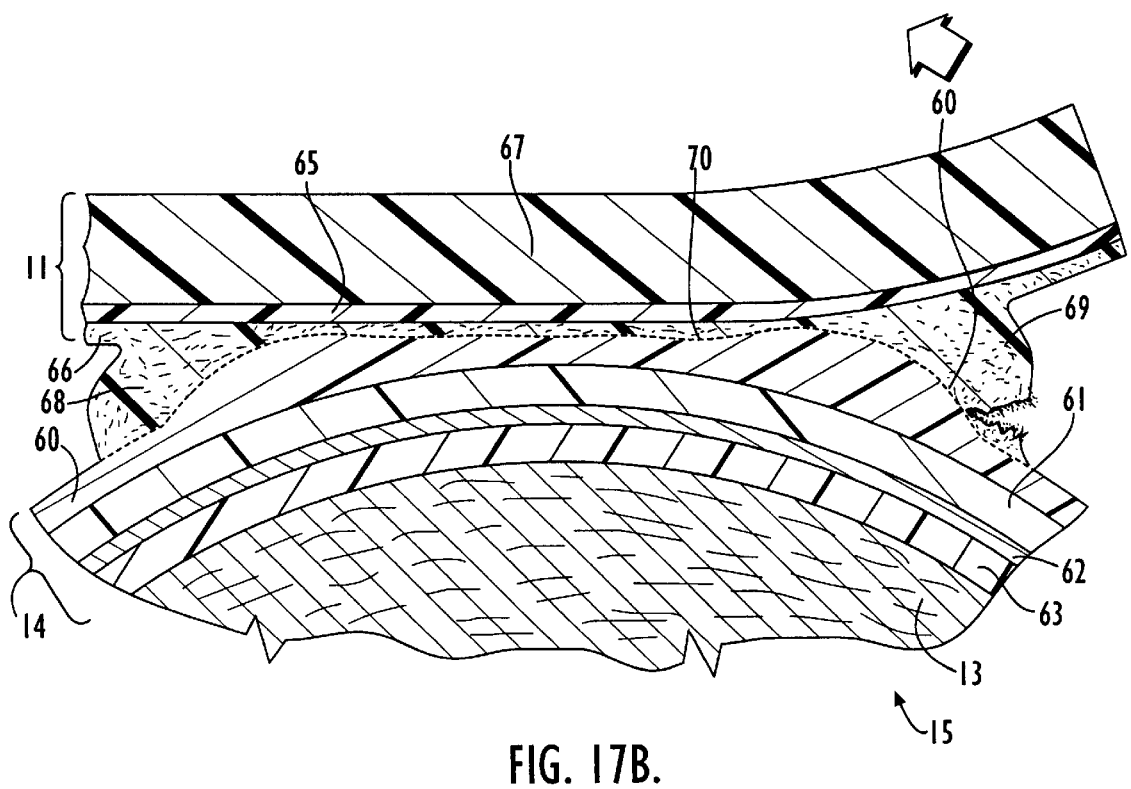
FIG. 17B is a greatly enlarged sectional view of the heat seal of the present invention illustrating the initiation of a tear in the seal layers during opening of the container.
Figure 17C:
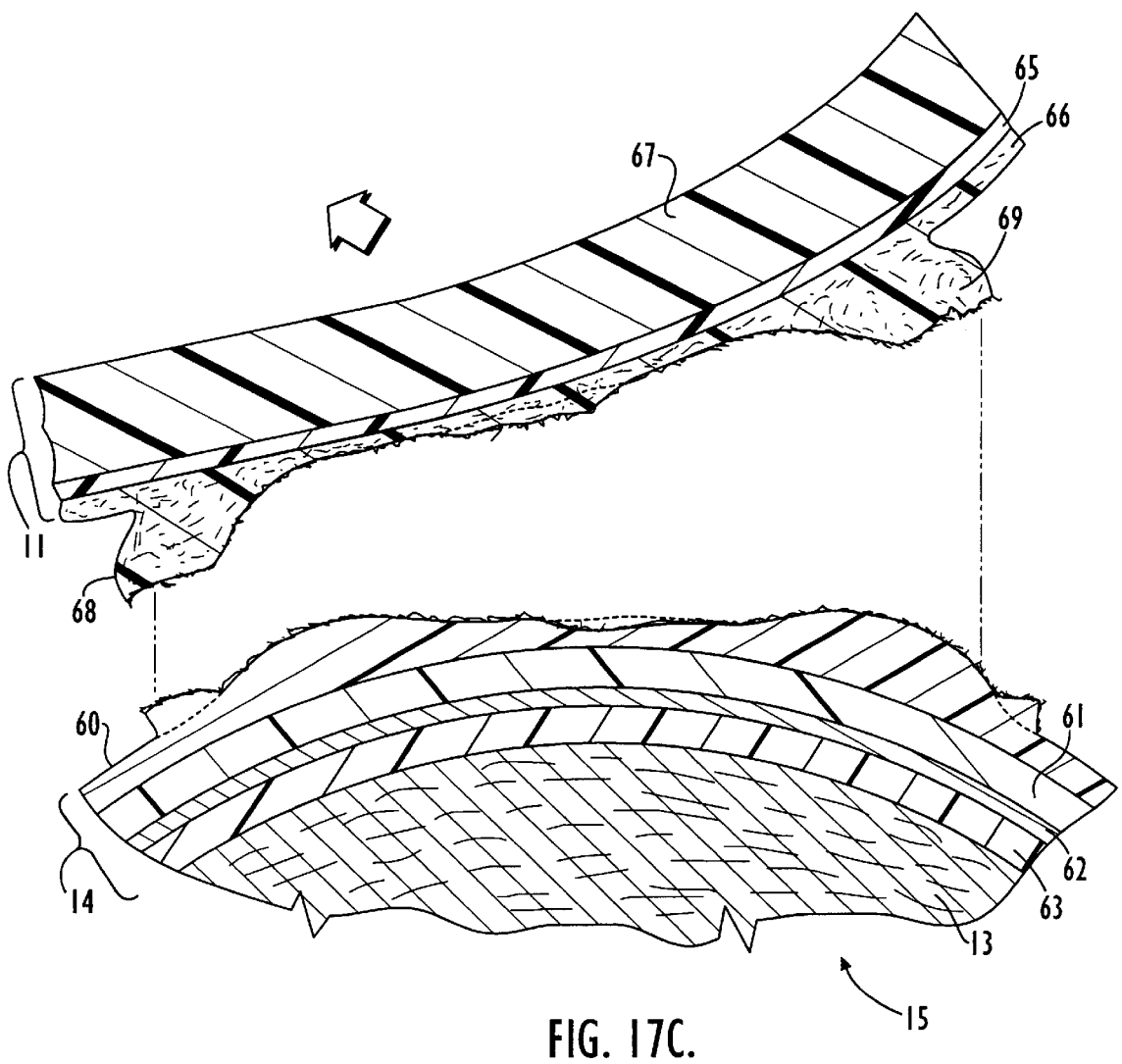
FIG. 17C is a greatly enlarged sectional view of the heat seal of the present invention after the container has been opened.

FIG. 15 illustrates the opening mechanism for container 10 of the present invention. As shown by FIGS. 17B and 17C, the shearing force generated during opening of the container 10 causes a tear to propagate through the seal layer 60 of the liner ply 14 and/or the seal layer 66 of the lid 11. The seal layer 60 of the liner ply 14 and the seal layer 66 of the lid 11 provide a bond strength between the barrier layer 65 of the lid 11 and the barrier layer 61 of the liner ply 14 that is lower than the bond strength between the barrier layer 61 of the liner ply 14 and the paperboard body ply 13 (or any other intermediate layers such as the metallized coating 62 of the liner 14). As a result, shearing that takes place during the opening of the tubular container 10 occurs only between, and not through, the barrier layers of the liner ply 14 and lid 11. When the tubular container 10 of the present invention is opened, unsightly tears through the barrier layer 61 of the liner ply 14 do not occur.

Another advantageous feature of the present invention is the wrinkled or "matte" surface of the liner ply 14 which can be seen in FIGS. 1 and 2. The wrinkled surface is provided by the method and apparatus illustrated in FIG. 6 which causes equal lengths of the body ply 13 and liner ply 14 to be adhered together before being wrapped around the mandrel 47. As the plies are wrapped around the mandrel 47, the much stiffer body ply 13 causes the liner ply 14 to become compressed. In other words, the body ply 13 initially defines a circumferential length corresponding to one revolution around the mandrel 47 and the liner ply 14 has an initial length per revolution equal to that of the body ply 13. However, when wrapped, the liner ply 14 is forced into a circular section having a slightly smaller radius than the radius of the circle defined by the body ply 13. As such, the liner ply 14 is circumferentially compressed relative to the body ply 13.

The circumferential compression is advantageous if certain types of liner ply 14 are used because the compression may cause an initially smooth liner ply to have a wrinkled or matte surface once wrapped. The wrinkled surface finish has an "alligator skin" type appearance caused by many small peaks and valleys in the surface of the liner ply 14. The wrinkled surface is highly advantageous because it dramatically decreases the amount of winding friction between the liner ply 14 and mandrel 47. While not wishing to be bound by theory, it is believed that the decreased friction is due to the decreased surface area of the liner ply 14 (caused by the peaks and valleys thereof) which is in frictional contact with the mandrel 47. The friction is decreased so much that the lubricant and lubricant roller 44 can preferably be eliminated. One preferred material for the liner ply 14 includes a polyester barrier layer 61 which becomes wrinkled with circumferential compression.

An alternative embodiment of the tubular container 10 according to the present invention is illustrated in FIG. 12 and includes two overlying body plies 13a, 13b. This embodiment is advantageous if additional strength is necessary. A first body ply 13a is adhered to the liner 14 in the fashion discussed above and passed through the pair of nip rollers 36. A second body ply 13b is coated with a wet adhesive and then brought into engagement with the underside of the first body ply 13a so that they will be adhered together. The heating equipment used in connection with the first body ply 13a is not necessary with the second body ply 13b because the water in the adhesive on the second body ply can escape from the bond area after the body plies have been adhered together because both adjoining plies are made of pervious paperboard.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. For example, the tubular containers according to the present invention are not necessarily helically wound but may instead be longitudinally wrapped to create a "convolute" tube having an axially extending seam. In addition, although the tubular containers according to the present invention have been described primarily in connection with food products, it is to be understood that the containers could be used in connection with other products where the liner ply is advantageous such as, for example, ink or caulk. Although specific terms are employed herein, they are used in a generic and descriptive sense only and not for purposes of limitation.

That which is claimed:

1. A sealed composite container for products comprising:
   a tubular body member comprising at least one paperboard body ply and having an inner surface;
   a polymeric liner ply adhered to the inner surface of said tubular body member and comprising a barrier layer and a seal layer, said seal layer defining the innermost surface of said liner ply and comprising a heat flowable polymer, at least one end of said body member and said liner ply being rolled outwardly to form a flange exposing said seal layer; and
   a lid for closing said flanged end of said tubular body member, said lid comprising a barrier layer and a seal layer adjacent to said seal layer of said liner ply on the flange, said seal layer of said lid also comprising a heat flowable polymer,
   said seal layers being adhered together to form a heat seal between said lid and said liner ply, said heat seal comprising an inner bead formed of the heat flowable polymers of the seal layers and facing the interior of the container and an outer bead formed of the heat flowable polymers on the opposite side of the heat seal from the inner bead.

2. A container according to claim 1, wherein said heat seal further comprises a thin intermediate region between said inner and outer beads, said intermediate region having a lower bond strength than said inner and outer beads.

3. A container according to claim 1, wherein said seal layer of said lid has a lower melting point than said seal layer of said liner ply.

4. A container according to claim 1, wherein the melting point of said seal layer of said lid is between about 105° C. to about 130° C. and the melting point of said seal layer of said liner is between about 120° C. to about 130° C.

5. A container according to claim 4, wherein the melting point of said seal layer of said lid is between about 105° C. to about 125° C. and the melting point of said seal layer of said liner is between about 125° C. to about 130° C.

6. A container according to claim 1, wherein said heat seal provides a bond strength between said barrier layer of said lid and said barrier layer of said liner ply, said bond strength being less than the bond strength between said barrier layer of said liner ply and said tubular body member behind said barrier layer such that, upon opening, shearing occurs only between the barrier layers.

7. A container according to claim 1, wherein said heat seal has a tensile strength of at least about 1 lb/linear inch when said heat seal is pulled at a 90degree angle from the plane of the top of the container and parallel to the axis of the container.

8. A container according to claim 7, wherein said heat seal has a tensile strength of about 8 to about 12 lbs/linear inch when said heat seal is pulled at a 90 degree angle from the plane of the top of the container and parallel to the axis of the container.

9. A container according to claim 1, wherein said heat seal has a peel strength of at least about 1 lb/linear inch when the heat seal is pulled at a 135 to 180 degree angle from the plane of the top of the container.

10. A container according to claim 9, wherein said heat seal has a peel strength of about 5 to about 10 lbs/linear inch when the heat seal is pulled at a 135 to 180 degree angle from the plane of the top of the container.

11. A container according to claim 1, wherein said seal layer of said liner ply is selected from the group consisting of high density polyethylene, low density polyethylene, metallocenes and mixtures thereof.

12. A container according to claim 1, wherein said seal layer of said lid is selected from the group consisting of ethylene vinyl acetate, high density polyethylene, low density polyethylene, ethyl methyl acrylate, metallocenes and mixtures thereof.

13. A container according to claim 1, wherein said barrier layer of said lid is selected from the group consisting of polyethylene terephthalate, modified polyethylene terephthalate, metallized polyethylene terephthalate, metallized modified polyethylene terephthalate, polyethylene napthalate, metallized polyethylene napthalate, metallized polypropylene, metal oxide and silicate coated polyester, metal oxide and silicate coated polypropylene, ethylene vinyl alcohol and mixtures thereof.

14. A container according to claim 1, wherein said barrier layer of said liner ply is selected from the group consisting of polyethylene terephthalate, modified polyethylene terephthalate, metallized polyethylene terephthalate, metallized modified polyethylene terephthalate, polyethylene napthalate, metallized polyethylene napthalate, metallized polypropylene, metal oxide and silicate coated polyester, metal oxide and silicate coated polypropylene, ethylene vinyl alcohol and mixtures thereof.

15. A sealed composite container for products comprising:
a tubular body member comprising at least one paperboard body ply and having an inner surface;
a polymeric liner ply adhered to the inner surface of said tubular body member and comprising a barrier layer and a seal layer, said seal layer defining the innermost surface of said liner ply and comprising a heat flowable polymer, said barrier layer being adhered to the body ply with a predetermined bond strength, and at least one end of said body member and said liner ply being rolled outwardly to form a flange exposing said seal layer; and
a lid for closing said flanged end of said tubular body member, said lid comprising a barrier layer and a seal layer adjacent to said seal layer of said liner ply on the flange, said seal layer of said lid also comprising a heat flowable polymer,
said seal layers being adhered together to form a heat seal between said lid and said liner ply, said heat seal comprising an inner bead formed of the heat flowable polymers of the seal layers and facing the interior of the container and an outer bead formed of the heat flowable polymers on the opposite side of the heat seal from the inner bead, said seal layers providing a bond strength between said barrier layers less than the bond strength between the barrier layer of the liner ply and the paperboard body ply such that, upon opening, shearing occurs only between said barrier layers.

16. A container according to claim 15, wherein said heat seal further comprises a thin, discontinuous intermediate region between said inner and outer beads, said intermediate region having a lower bond strength than said inner and outer beads.

17. A container according to claim 15, wherein said seal layer of said lid has a lower melting point than said seal layer of said liner ply.

18. A container according to claim 15, wherein the melting point of said seal layer of said lid is between about 105° C. to about 130° C. and the melting point of said seal layer of said liner is between about 120° C. to about 130° C.

19. A container according to claim 18, wherein the melting point of said seal layer of said lid is between about 105° C. to about 125° C. and the melting point of said seal layer of said liner is between about 125° C. to about 130° C.

20. A container according to claim 15, wherein said heat seal has a tensile strength of at least about 1 lb/linear inch when said heat seal is pulled at a 90 degree angle from the plane of the top of the container and parallel to the axis of the container.

21. A container according to claim 20, wherein said heat seal has a tensile strength of about 8 to about 12 lbs/linear inch when said heat seal is pulled at a 90 degree angle from the plane of the top of the container and parallel to the axis of the container.

22. A container according to claim 15, wherein said heat seal has a peel strength of at least about 1 lb/linear inch when the heat seal is pulled at a 135 to 180 degree angle from the plane of the top of the container.

23. A container according to claim 22, wherein said heat seal has a peel strength of about 5 to about 10 lbs/linear inch when the heat seal is pulled at a 135 to 180 degree angle from the plane of the top of the container.

24. A container according to claim 15, wherein said seal layer of said liner ply is selected from the group consisting of high density polyethylene, low density polyethylene, metallocenes and mixtures thereof.

25. A container according to claim 15, wherein said seal layer of said lid is selected from the group consisting of ethylene vinyl acetate, high density polyethylene, low density polyethylene, ethyl methyl acrylate, metallocenes and mixtures thereof.

26. A container according to claim 15, wherein said barrier layer of said lid is selected from the group consisting of polyethylene terephthalate, modified polyethylene terephthalate, metallized polyethylene terephthalate, metallized modified polyethylene terephthalate, polyethylene napthalate, metallized polyethylene napthalate, metallized polypropylene, metal oxide and silicate coated polyester, metal oxide and silicate coated polypropylene, ethylene vinyl alcohol and mixtures thereof.

27. A container according to claim 15, wherein said barrier layer of said liner ply is selected from the group consisting of polyethylene terephthalate, modified polyethylene terephthalate, metallized polyethylene terephthalate, metallized modified polyethylene terephthalate, polyethylene napthalate, metallized polyethylene napthalate, metallized polypropylene, metal oxide and silicate coated polyester, metal oxide and silicate coated polypropylene, ethylene vinyl alcohol and mixtures thereof.

28. A sealed composite container for products comprising:

a tubular body member comprising at least one paperboard body ply and having an inner surface;

a polymeric liner ply adhered to the inner surface of said tubular body member and comprising a barrier layer and a seal layer, said seal layer defining the innermost surface of said liner ply and comprising a high density polyethlyene/ethylene acrylic acid blend, said barrier layer being adhered to the body ply with a predetermined bond strength, and at least one end of said body member and said liner ply being rolled outwardly to form a flange exposing said seal layer; and a lid for closing said flanged end of said tubular body member, said lid comprising a barrier layer and a seal layer adjacent to said seal layer of said liner ply on the flange, said seal layer of said lid comprising ethyl methyl acrylate, said seal layers being adhered together under heat and pressure to form a heat seal between said lid and said liner ply, said heat seal comprising an inner bead formed of the heat flowable polymers of the seal layers and facing the interior of the container and an outer bead formed of the heat flowable polymers on the opposite side of the heat seal from the inner bead, said seal layers providing a bond strength between said barrier layers less than the bond strength between the barrier layer of the liner ply and the paperboard body ply such that, upon opening, shearing occurs only between said barrier layers.

29. A method of manufacturing a sealed container for products comprising:

providing a tubular body member comprising at least one paperboard body ply and having an inner surface;

adhering a polymeric liner ply to the inner surface of the tubular body member, the liner ply comprising a barrier layer and a seal layer, the seal layer defining the innermost surface of the liner ply and comprising a heat flowable polymer;

rolling outwardly at least one end of the body member to form a flange exposing the seal layer;

providing a lid for closing the flanged end of said tubular body member, the lid comprising a barrier layer and a seal layer, the seal layer comprising a heat flowable polymer;

contacting the seal layer of the liner ply and the seal layer of the lid;

heating the two seal layers;

pressing the seal layers together to form an inner and an outer bead of seal layer material with a relatively thinner intermediate region of seal layer material therebetween, thereby hermetically sealing the lid to the liner ply.

30. A method according to claim 29, wherein said pressing step comprises pressing the lid and the tubular body member together using a heat seal die.

* * * * *